United States Patent
Zhang et al.

(10) Patent No.: US 9,679,160 B1
(45) Date of Patent: Jun. 13, 2017

(54) SYSTEMS AND METHODS FOR MAINTAINING ENCRYPTED SEARCH INDEXES ON THIRD-PARTY STORAGE SYSTEMS

(71) Applicant: Symantec Corporation, Mountain View, CA (US)

(72) Inventors: Haibin Zhang, Davis, CA (US); Scott Schneider, Sun Valley, CA (US); Walter Bogorad, Danville, CA (US); Sharada Sundaram, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 539 days.

(21) Appl. No.: 14/199,240

(22) Filed: Mar. 6, 2014

Related U.S. Application Data

(60) Provisional application No. 61/926,555, filed on Jan. 13, 2014.

(51) Int. Cl.
*G06F 17/30* (2006.01)
*G06F 21/62* (2013.01)

(52) U.S. Cl.
CPC .... *G06F 21/6272* (2013.01); *G06F 17/30106* (2013.01); *G06F 2221/2107* (2013.01)

(58) Field of Classification Search
CPC .............. G06F 17/30091; G06F 21/62; G06F 17/30109; G06F 17/30864; G06F 17/30949; G06F 21/6218; G06F 21/6227
See application file for complete search history.

(56) References Cited

U.S. PATENT DOCUMENTS

| | | |
|---|---|---|
| 8,401,185 B1 | 3/2013 | Telang |
| 8,458,494 B1 | 6/2013 | Bogorad |
| 2005/0157880 A1 | 7/2005 | Kurn et al. |
| 2007/0266258 A1 | 11/2007 | Brown et al. |
| 2008/0133935 A1 | 6/2008 | Elovici et al. |
| 2009/0300712 A1 | 12/2009 | Kaufmann et al. |

(Continued)

OTHER PUBLICATIONS

Kamara, Seny et al., "Cryptographic Cloud Storage", Proceedings of Financial Cryptography: Workshop on Real-Life Cryptographic Protocols and Standardization (RLCPS '10), (Jan. 2010).

(Continued)

*Primary Examiner* — Dinku Gebresenbet
(74) *Attorney, Agent, or Firm* — FisherBroyles LLP

(57) ABSTRACT

A computer-implemented method for maintaining encrypted search indexes on third-party storage systems may include (1) identifying a plurality of encrypted files, (2) identifying a plurality of keywords contained in the plurality of encrypted files, and (3) generating an encrypted search index for searching the plurality of encrypted files by (i) identifying, for each keyword in the plurality of keywords, a list of encrypted files in the plurality of encrypted files that contain the keyword, (ii) encrypting the list of encrypted files, and (iii) storing the encrypted list of encrypted files such that the encrypted list of encrypted files can be identified using a lookup key generated by applying a pseudo-random function to the keyword. Various other methods, systems, and computer-readable media are also disclosed.

11 Claims, 13 Drawing Sheets

(56) References Cited

U.S. PATENT DOCUMENTS

| | | | | | |
|---|---|---|---|---|---|
| 2009/0327749 | A1* | 12/2009 | Sacson | ............ | G06F 17/30091 713/189 |
| 2010/0095118 | A1 | 4/2010 | Meka | | |
| 2012/0078914 | A1* | 3/2012 | Roeder | ............ | G06F 17/30619 707/741 |
| 2015/0143112 | A1 | 5/2015 | Yavuz et al. | | |

OTHER PUBLICATIONS

Goh, Eu-Jin "Secure Indexes", http://crypto.stanford.edu/~eujin/papers/secureindex/secureindex.pdf, (May 5, 2004).
Attila Altay Yavuz, et al.; Method for Dynamic, Non-Interactive and Parallelizable Searchable Symmetric Encryption With Secure and Efficient Updates; U.S. Appl. No. 61/892,641, filed Oct. 18, 2013.
"Solr", http://lucene.apache.org/solr/, as accessed Jan. 7, 2014, The Apache Software Foundation, (Jan. 19, 2007).
"Lucene", http://lucene.apache.org/, as accessed Jan. 7, 2014, The Apache Software Foundation, (Feb. 16, 2005).
Fanglu Guo, et al; Systems and Methods for Validating Ownership of Deduplicated Data; U.S. Appl. No. 13/314,496, filed Dec. 8, 2011.
Anthony Langsworth; Systems and Methods for Encoding Data; U.S. Appl. No. 13/240,959, filed Sep. 22, 2011.
Srinivas Chenna; Systems and Methods for Transferring Authentication Credentials; U.S. Appl. No. 13/483,835, filed May 30, 2012.
Steve Chazin, et al; Systems and Methods for Sharing Data Stored on Secure Third-Party Storage Platforms; U.S. Appl. No. 13/952,487, filed Jul. 26, 2013.
Kamara, Seny et al., "Cryptographic Cloud Storage", http://research.microsoft.com/en-us/people/klauter/cryptostoragerlcps.pdf, as accessed Jan. 7, 2014, Workshop on Real-Life Cryptographic Protocols and Standardization, 2010, (2010).
Rogaway, Phillip et al., "The Security of Ciphertext Stealing", http://www.cs.ucdavis.edu/~rogaway/papers/steal.pdf, as accessed Jan. 7, 2014, 19th International Workshop on Fast Software Encryption, FSE 2012, Washington, D.C., USA, (Mar. 20, 2012).
Deb Banerjee; Systems and Methods for Scanning Data Stored on Cloud Computing Platforms; U.S. Appl. No. 13/925,357, filed Jun. 24, 2013.
Walter Bogorad, et al.; Systems and Methods for Secure Third-Party Data Storage; U.S. Appl. No. 14/092,757, filed Nov. 27, 2013.
"Lucenetransform", https://code.google.com/p/lucenetransform/, as accessed Jan. 7, 2014, (Nov. 20, 2011).
"Dropbox", http://www.dropbox.com, as accessed Jan. 7, 2014, (Dec. 26, 1996).
Scott Schneider, et al.; Systems and Methods for Searching Shared Encrypted Files on Third-Party Storage Systems; U.S. Appl. No. 14/199,158, filed Mar. 6, 2014.
Haibin Zhang, et al.; Systems and Methods for Securing Data at Third-Party Storage Services; U.S. Appl. No. 14/199,339, filed Mar. 6, 2014.
Haibin Zhang et al.; Systems and Methods for Maintaining Encrypted Search Indexes on Third-Party Storage Systems; U.S. Appl. No. 15/490,051; Filed Apr. 18, 2017.

* cited by examiner

SYSTEMS AND METHODS FOR MAINTAINING ENCRYPTED SEARCH INDEXES ON THIRD-PARTY STORAGE SYSTEMS

CROSS REFERENCE TO RELATED APPLICATION

This application claims the benefit of U.S. Provisional Application No. 61/926,555, filed 13 Jan. 2014, the disclosure of which is incorporated, in its entirety, by this reference.

BACKGROUND

Organizations and consumers increasingly use third-party services to store data. Third-party storage services may provide a number of benefits to customers, including flexibility, low capitalization requirements, add-on services, data sharing, and centralized access to data.

Many third-party storage customers want or need their data to be stored in an encrypted state due to privacy concerns or in order to ensure compliance with internal or external data-protection requirements, such as governmental laws and regulations, partnership agreements with other organizations, etc. As such, many traditional third-party storage services store customer data in an encrypted state.

Some conventional third-party storage services may maintain search indexes (e.g., keyword indexes) that enable a customer to search the customer's encrypted documents. Unfortunately, if these search indexes are not properly secured, they may reveal private data contained in the customer's encrypted documents to other customers, intruders, and/or administrators of the third-party storage service. Accordingly, the instant disclosure identifies and addresses a need for additional and improved systems and methods for searching shared encrypted files on third-party storage systems.

SUMMARY

As will be described in greater detail below, the instant disclosure describes various systems and methods for maintaining encrypted search indexes on third-party storage systems. In one example, a computer-implemented method for maintaining encrypted search indexes on third-party storage systems may include (1) identifying a plurality of encrypted files, (2) identifying a plurality of keywords contained in the plurality of encrypted files, and (3) generating an encrypted search index for searching the plurality of encrypted files by (i) identifying, for each keyword in the plurality of keywords, a list of encrypted files in the plurality of encrypted files that contain the keyword (e.g., a list of references to the encrypted files that contain the keyword), (ii) encrypting the list of encrypted files, and (iii) storing the encrypted list of encrypted files such that the encrypted list of encrypted files can be identified using a lookup key generated by applying a pseudo-random function to the keyword.

In one embodiment, the computer-implemented method may further include (1) receiving a request from a user to search the plurality of encrypted files for the keyword, (2) generating the lookup key by applying the pseudo-random function to the keyword, (3) identifying the encrypted list of encrypted files with the lookup key, (4) decrypting the list of encrypted files, and (5) using the decrypted list of encrypted files to generate a response to the request from the user.

In some embodiments, the computer-implemented method may further include detecting the deletion of at least one encrypted file contained in the list of encrypted files, and the step of using the decrypted list of encrypted files to generate the response to the request from the user may include ensuring that the deleted encrypted file is not included in the response. In at least one embodiment, the computer-implemented method may further include updating the list of encrypted files to reflect the deletion of the encrypted file.

In some embodiments, the plurality of encrypted files may belong to the user, the step of encrypting the list of encrypted files may include encrypting the list of encrypted files using an encryption key of the user, and the step of decrypting the list of encrypted files may include decrypting the list of encrypted files using a decryption key of the user.

In some embodiments, the step of encrypting the list of encrypted files may include encrypting the list of encrypted files using a mode of operation with a randomized counter. In at least one embodiment, the step of encrypting the list of encrypted files may include generating the randomized counter by applying the pseudo-random function to the keyword.

In some embodiments, the step of storing the encrypted list of encrypted files may include storing the encrypted list in a data structure that maps lookup keys to lists of encrypted files. In one embodiment, the data structure may include a hash table.

In one embodiment, a system for implementing the above-described method may include (1) a file-identifying module that identifies a plurality of encrypted files, (2) a keyword-identifying module that identifies a plurality of keywords contained in the plurality of encrypted files, (3) a generating module that generates an encrypted search index for searching the plurality of encrypted files by (i) identifying, for each keyword in the plurality of keywords, a list of encrypted files in the plurality of encrypted files that contain the keyword, (ii) encrypting the list of encrypted files, and (iii) storing the encrypted list of encrypted files such that the encrypted list of encrypted files can be identified using a lookup key generated by applying a pseudo-random function to the keyword, and (4) at least one processor configured to execute the file-identifying module, the keyword-identifying module, and the generating module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a plurality of encrypted files, (2) identify a plurality of keywords contained in the plurality of encrypted files, and (3) generate an encrypted search index for searching the plurality of encrypted files by (i) identifying, for at least one keyword in the plurality of keywords, a list of encrypted files in the plurality of encrypted files that contain the keyword, (ii) encrypting the list of encrypted files, and (iii) storing the encrypted list of encrypted files such that the encrypted list of encrypted files can be identified using a lookup key generated by applying a pseudo-random function to the keyword.

In another example, a computer-implemented method for maintaining encrypted search indexes on third-party storage systems may include (1) identifying a search index used by a search engine that includes a plurality of data chunks that each include one or more data blocks, and (2) encrypting the search index by (i) calculating, for each data chunk in the plurality of data chunks, an initialization vector for encrypting the data chunk such that no two data chunks in the plurality of data chunks have identical initialization vectors and (ii) using the initialization vector to encrypt the data chunk.

In one embodiment, a search-index initialization vector may be designated for encrypting the search index, and the initialization vector for encrypting the data chunk may be calculated based on the search-index initialization vector.

In one embodiment, the step of calculating the initialization vector may include (1) calculating a unique nonce for the data chunk and (2) calculating the initialization vector by summing the search-index initialization vector with a product of the unique nonce and a number of the one or more data blocks.

In some embodiments, the unique nonce of each of the plurality of data chunks may be calculated using a global counter such that no nonce is used more than once. In one embodiment, a new unique nonce may be generated for the data chunk each time the data chunk is reencrypted.

In some embodiments, the computer-implemented method may further include (1) encrypting the unique nonce using a length-preserving cipher (e.g., format-preserving encryption) and (2) storing the encrypted unique nonce. In one embodiment, the unique nonce may be smaller than the initialization vector.

In one embodiment, the step of using the initialization vector to encrypt the data chunk may include encrypting the data chunk using a mode of operation with a randomized counter that may be generated based on the initialization vector. For example, the step of using the initialization vector to encrypt the data chunk may include encrypting the data chunk using a block cipher implemented in CTR$ mode, and the starting value of the randomized counter used by the block cipher implemented in CTR$ mode may be equal to the initialization vector.

In some examples, the computer-implemented method may further include ensuring that each value in a counter range used to encrypt the data chunk is used only once.

In one embodiment, a system for implementing the above-described method may include (1) a search-index identifying module that identifies a search index used by a search engine that includes a plurality of data chunks that each include one or more data blocks, (2) a search-index encrypting module that encrypts the search index by (i) calculating, for each data chunk in the plurality of data chunks, an initialization vector for encrypting the data chunk such that no two data chunks in the plurality of data chunks have identical initialization vectors, and (ii) using the initialization vector to encrypt the data chunk, and (3) at least one processor configured to execute the search-index identifying module and the search-index encrypting module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a search index used by a search engine that includes a plurality of data chunks that each include one or more data blocks, (2) encrypt the search index by (i) calculating, for each data chunk in the plurality of data chunks, an initialization vector for encrypting the data chunk such that no two data chunks in the plurality of data chunks have identical initialization vectors, and (ii) using the initialization vector to encrypt the data chunk.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
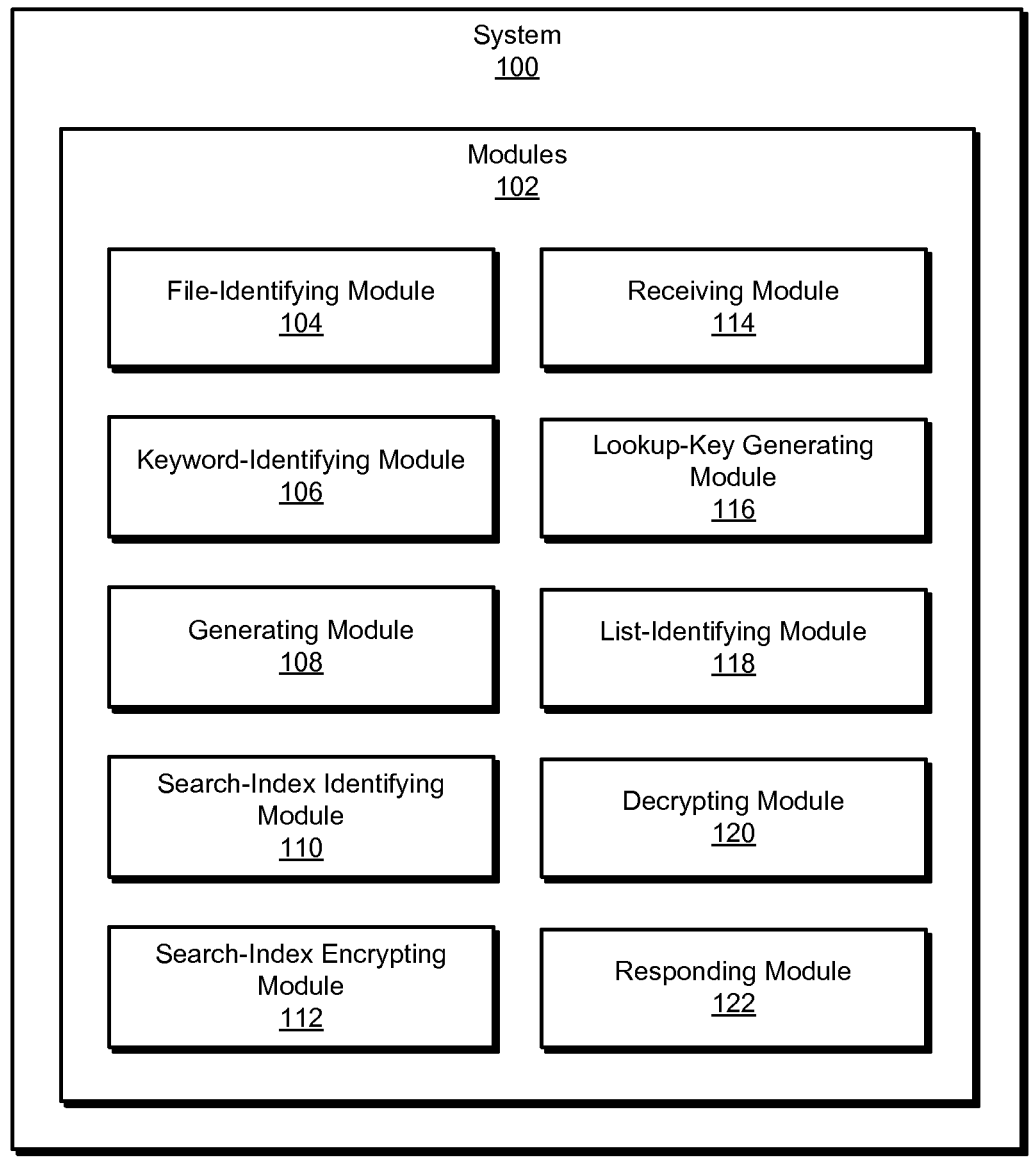
FIG. 1 is a block diagram of an exemplary system for maintaining encrypted search indexes on third-party storage systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for maintaining encrypted search indexes on third-party storage systems. As will be explained in greater detail below, by generating encrypted search indexes on third-party storage systems that may be accessed using lookup keys generated by applying a pseudo-random function to keywords, the systems and methods described herein may enable secure keyword indexing and efficient keyword searching of encrypted files stored on third-party storage systems. Moreover, by encrypting search indexes of search engines (e.g., APACHE's LUCENE and SOLR), these systems and methods may improve the security of encrypted files that are indexed by the search engines while maintaining the search functionality provided by the search engines. Embodiments of the instant disclosure may also provide various other advantages and features, as discussed in greater detail below.

Figure 2:
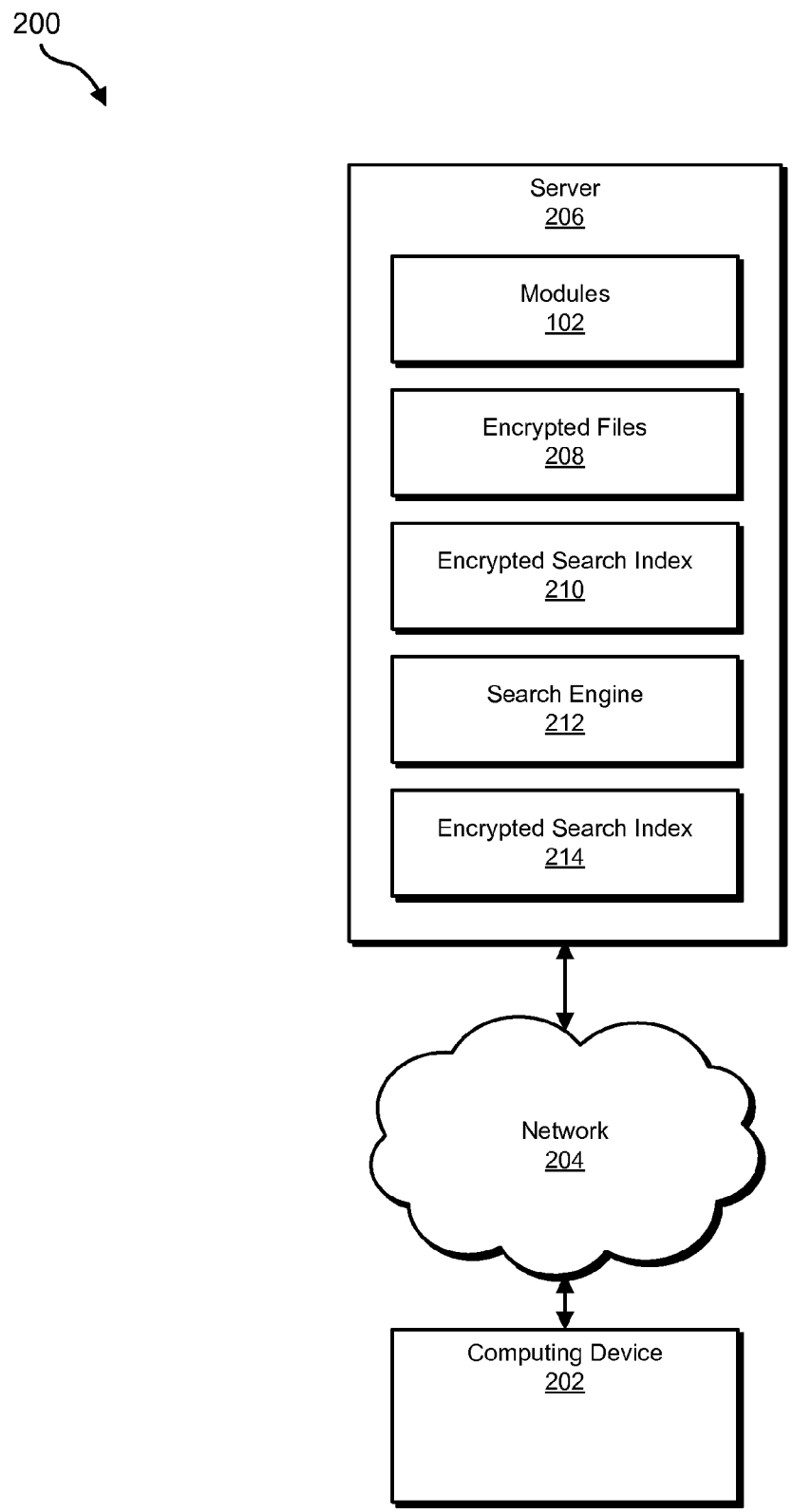
FIG. 2 is a block diagram of an additional exemplary system for maintaining encrypted search indexes on third-party storage systems.

The following will provide, with reference to FIGS. 1-2, detailed descriptions of exemplary systems for maintaining encrypted search indexes on third-party storage systems. Detailed descriptions of corresponding computer-implemented methods will also be provided in connection with FIGS. 3-11. In addition, detailed descriptions of an exemplary computing system and network architecture capable of implementing one or more of the embodiments described herein will be provided in connection with FIGS. 12 and 13, respectively.

FIG. 1 is a block diagram of an exemplary system 100 for maintaining encrypted search indexes on third-party storage systems. As illustrated in this figure, exemplary system 100 may include one or more modules 102 for performing one or more tasks. For example, and as will be explained in greater detail below, exemplary system 100 may include a file-identifying module 104 that identifies a plurality of encrypted files. Exemplary system 100 may also include a keyword-identifying module 106 that identifies a plurality of keywords that are contained in at least one of the plurality of encrypted files. Exemplary system 100 may further include a generating module 108 that generates an encrypted search index for searching the plurality of encrypted files by (i) identifying, for at least one keyword in the plurality of keywords, a list of encrypted files in the plurality of encrypted files that contain the keyword, (ii) encrypting the list of encrypted files, and (iii) storing the encrypted list of encrypted files such that the encrypted list of encrypted files can be identified using a lookup key generated by applying a pseudo-random function to the keyword.

In addition, and as will be described in greater detail below, exemplary system 100 may include a search-index identifying module 110 that identifies a search index used by a search engine that includes a plurality of data chunks that each include one or more data blocks. Exemplary system 100 may also include a search-index encrypting module 112 that encrypts the search index by (i) calculating, for each data chunk in the plurality of data chunks, an initialization vector for encrypting the data chunk such that no two data chunks in the plurality of data chunks have identical initialization vectors, and (ii) using the initialization vector to encrypt the data chunk.

As shown in FIG. 1, exemplary system 100 may further include a receiving module 114 that receives a request from a user to search the plurality of encrypted files for the keyword, a lookup-key generating module 116 that generates the lookup key by applying the pseudo-random function to the keyword, a list-identifying module 118 that identifies the encrypted list of encrypted files with the lookup key, a decrypting module 120 that decrypts the list of encrypted files, and a responding module 122 that uses the decrypted list of encrypted files to generate a response to the request from the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 1210 in FIG. 12, and/or portions of exemplary network architecture 1300 in FIG. 13. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

Figure 4:
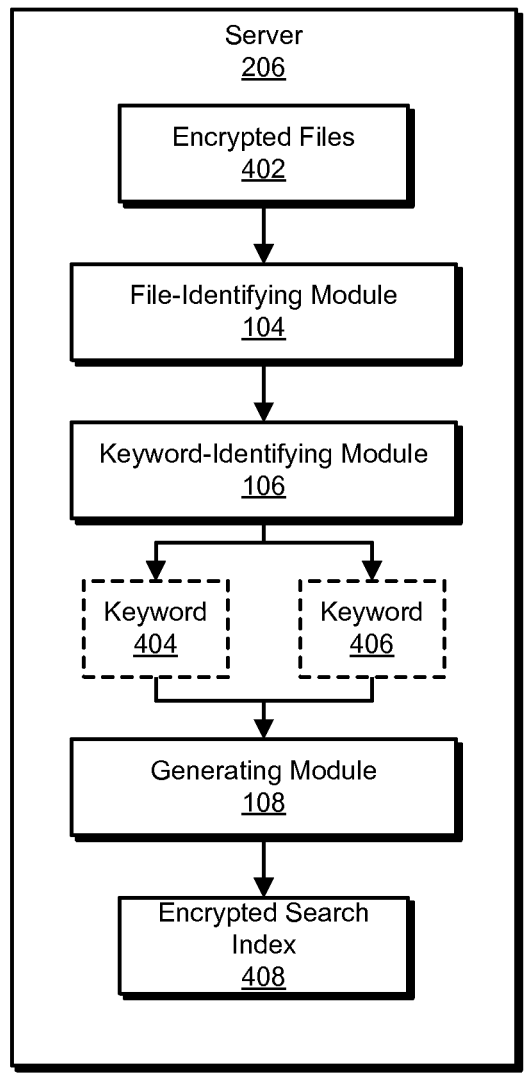
FIG. 4 is a block diagram of an additional exemplary system for maintaining encrypted search indexes on third-party storage systems.

In one embodiment, one or more of modules 102 from FIG. 1 may, when executed by at least one processor of computing device 202 and/or server 206, enable computing device 202 and/or server 206 to maintain an encrypted search index 210 for searching encrypted files 208 stored to server 206. For example as illustrated in FIG. 4, one or more of modules 102 may cause server 206 to (1) identify encrypted files 402, (2) identify keywords 404 and 406 that are contained in encrypted files 402, and (3) generate an encrypted search index 408 for searching encrypted files 402 by (i) identifying, for each of keywords 404 and 406, a list of encrypted files in encrypted files 402 that contain the keyword, (ii) encrypting the list of encrypted files, and (iii) storing the encrypted list of encrypted files such that the encrypted list of encrypted files can be identified using a lookup key generated by applying a pseudo-random function to the keyword.

Figure 10:
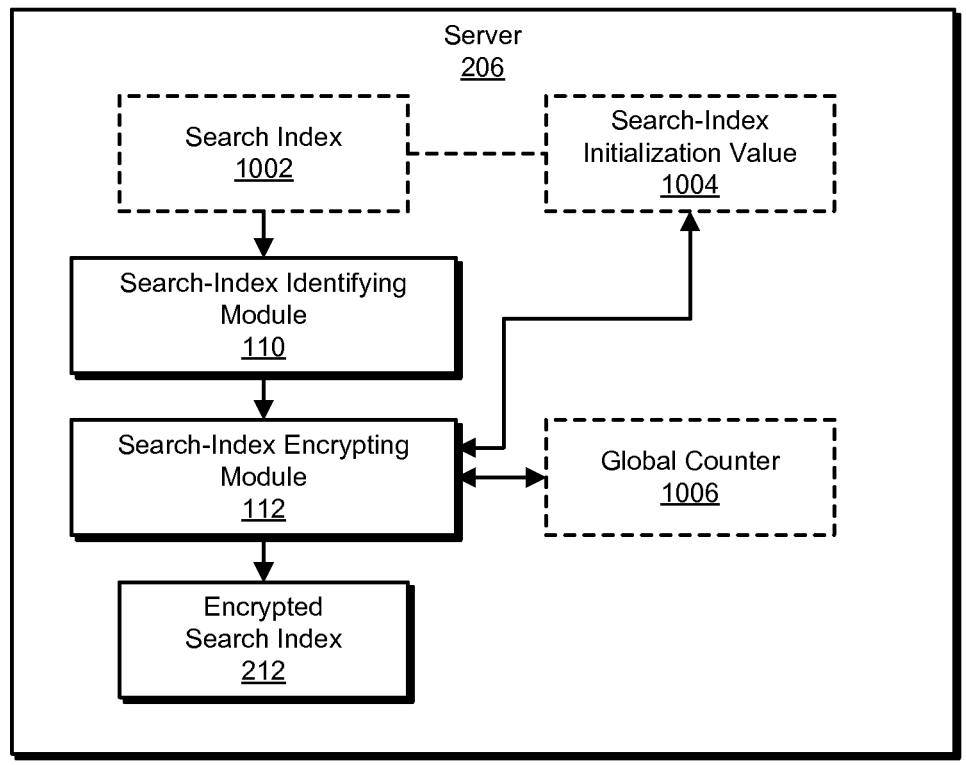
FIG. 10 is a block diagram of an additional exemplary system for maintaining encrypted search indexes on third-party storage systems.

In some examples, one or more of modules 102 may cause computing device 202 and/or server 206 to maintain an encrypted search index 214 for use by a search engine 212. For example as illustrated in FIG. 10, one or more of modules 102 may cause server 206 to (1) identify a search index 1002 used by search engine 212 that includes a plurality of data chunks that each include one or more data blocks and (2) encrypt search index 1002 by (i) calculating, for each data chunk in search index 1002, an initialization vector for encrypting the data chunk such that no two data chunks in the plurality of data chunks have identical initialization vectors, and (ii) using the initialization vector to encrypt the data chunk.

Computing device 202 and server 206 generally represent any type or form of computing device capable of reading computer-executable instructions. Examples of computing device 202 and server 206 include, without limitation, servers, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 1210 in FIG. 12, or any other suitable computing device.

In at least one example, computing device 202 may represent a user's computing device with which the user may access data stored on a third-party storage system. In some examples, computing device 202 may represent a client system that may be owned and/or administrated by an entity distinct from an owner and/or administrator of the third-party storage system. In at least one example, server 206 may represent at least a portion of a third-party storage system.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1300 in FIG. 13, or the like. Network 204 may facilitate communication or data transfer using wireless or wired connections. In one embodiment, network 204 may facilitate communication between computing device 202 and server 206.

Figure 3:
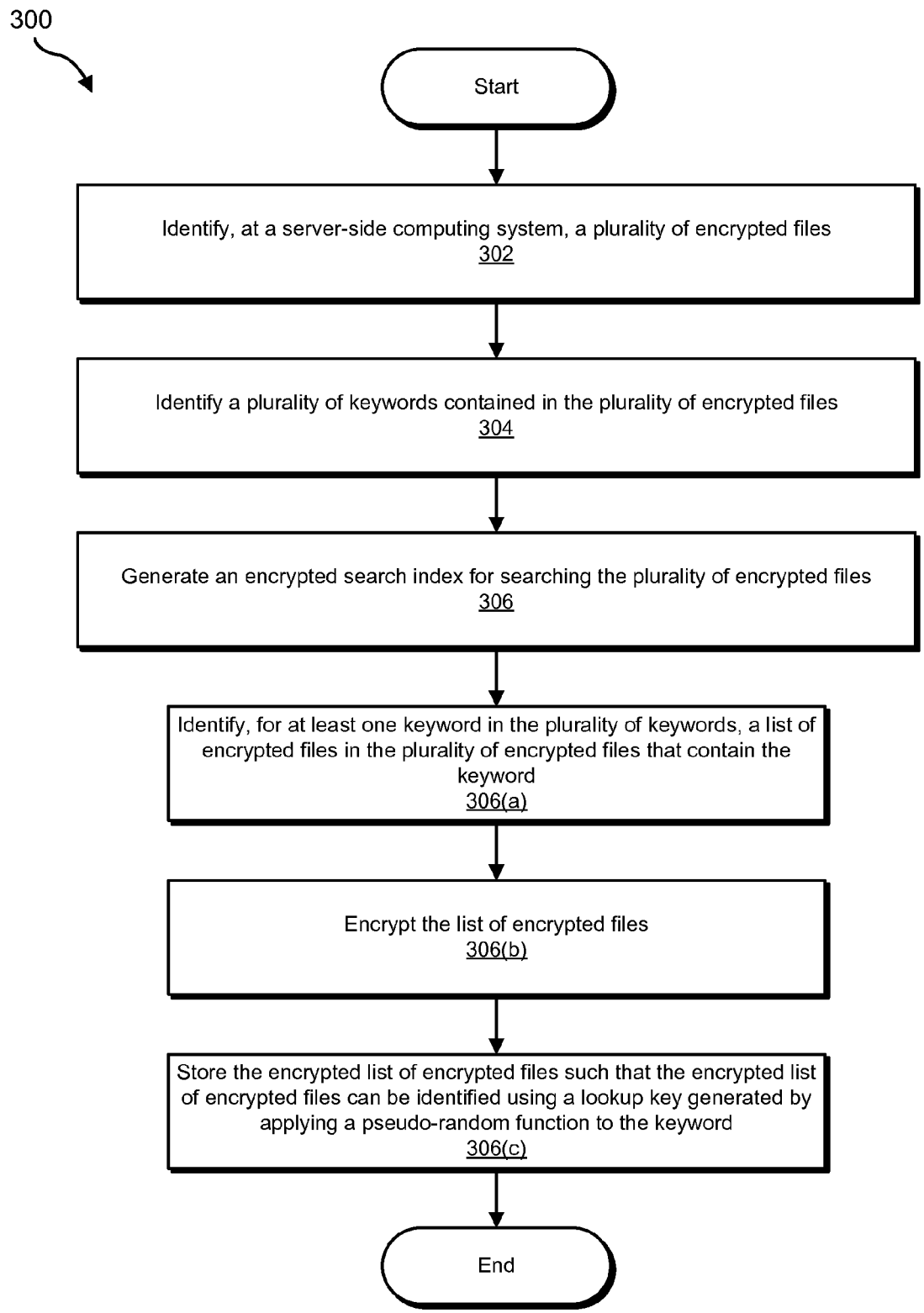
FIG. 3 is a flow diagram of an exemplary method for maintaining encrypted search indexes on third-party storage systems.

FIG. 3 is a flow diagram of an exemplary computer-implemented method 300 for maintaining encrypted search indexes on third-party storage systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1210 in FIG. 12, and/or portions of exemplary network architecture 1300 in FIG. 13.

As illustrated in FIG. 3, at step 302 one or more of the systems described herein may identify, at a server-side computing system, a plurality of encrypted files. For example, file-identifying module 104 may, as part of server 206 in FIG. 2, identify encrypted files 208. Using FIG. 4 as an additional example, file-identifying module 104 may identify encrypted files 402.

In some examples, the server-side computing system may operate as part of a third-party storage system. As used herein, the phrase "third-party storage system" may refer to any type or form of storage system, including a cloud-based storage system, that is capable of storing files on behalf of one or more users. Examples of third-party storage systems include, without limitation, CARBONITE, ICLOUD, DROPBOX, GOOGLE DRIVE, MICROSOFT SKYDRIVE, and NORTON ZONE.

The term "file," as used herein, may refer to any suitable unit of information that may be stored at a third-party storage system. For example, the term "file" may refer to a data object, data segment, portion of a data stream, database, database entry, and/or an electronic document. The term "encrypted file," as used herein, may refer to any file that has been encrypted.

The systems described herein may perform step 302 in a variety of contexts. In general, file-identifying module 104 may identify encrypted files as part of generating and/or maintaining a search index for searching the encrypted files. In some examples, file-identifying module 104 may identify encrypted files as part of generating and storing the encrypted files to a third-party storage system. For example, file-identifying module 104 may identify files before the files are encrypted. In at least one example, file-identifying module 104 may identify each encrypted file to which a user of a third-party storage system has access so that the systems described herein may maintain a separate search index for the user that enables the user to search the encrypted files to which the user has access.

At step 304, one or more of the systems described herein may identify a plurality of keywords contained in the plurality of encrypted files. For example, keyword-identifying module 106 may, as part of server 206 in FIG. 2, identify one or more keywords that are contained in encrypted files 208. Using FIG. 4 as an additional example, keyword-identifying module 106 may identify keywords 404 and 406 contained in encrypted files 402.

As used herein, the term "keyword" generally refers to any information associated with an encrypted file that may be used to identify an encrypted file. Examples of keywords include, without limitation, words, phrases, and/or strings of characters contained in or associated with an unencrypted version of an encrypted file.

The systems described herein may perform step 304 in any suitable manner. For example, keyword-identifying module 106 may extract one or more keywords from the contents or file name of an unencrypted version of each encrypted file identified as part of step 302. Keyword-identifying module 106 may decrypt the encrypted files before identifying the keywords contained in the encrypted files. Alternatively, keyword-identifying module 106 may identify keywords contained in files before the files are encrypted. For example, keyword-identifying module 106 may identify keywords contained in encrypted files as part of generating and storing the encrypted files.

At step 306, one or more of the systems described herein may generate an encrypted search index for searching the plurality of encrypted files. For example, generating module 108 may, as part of server 206 in FIG. 2, generate encrypted search index 210 for searching encrypted files 208. Using FIGS. 4 and 5 as an additional example, generating module 108 may generate encrypted search index 408 for searching encrypted files 402.

As used herein, the term "search index" may refer to any collection of information that may enable one or more users of a third-party storage system to search all or a portion of the encrypted files stored at the third-party storage system. As will be explained in greater detail below, search indexes may map keywords to information about the encrypted files that contain the keywords. In general, the systems described herein may encrypt search indexes with cryptographic keys to prevent data leaks. In some examples, the systems described herein may limit which users have access to a search index by limiting which users have access to these cryptographic keys. In one example, the systems described herein may generate a search index for searching the encrypted files to which a single user has access and may limit access to the search index by encrypting the search index with a cryptographic key designated for the user.

The systems described herein may generate an encrypted search index by performing one or more steps (e.g., steps 306(a), 306(b), and 306(c)). For example, at step 306(a), one or more of the systems described herein may identify, for at least one keyword in the plurality of keywords, a list of encrypted files in the plurality of encrypted files that contain the keyword. Using FIGS. 4 and 5 as an example, generating module 108 may generate list 502 that may include information about which of encrypted files 402 contains keyword 404 and may generate list 504 that may include information about which of encrypted files 402 contains keyword 406.

As used herein, the phrase "list of encrypted files" may generally refer to a collection of information about one or more encrypted files that contain a particular keyword. In some examples, a list of encrypted files may include a reference (e.g., a file pointer) to each encrypted file that contains a keyword, information that indicates the location of the keyword in an unencrypted version of each encrypted file in the list of encrypted files, and/or the number of times the keyword is found in an unencrypted version of each encrypted file. In some examples, generating module 108 may compile a list of encrypted files as a linked list or an array.

At step 306(*b*), one or more of the systems described herein may encrypt the list of encrypted files. Using FIG. 5 as an example, generating module 108 may generate encrypted list 506 by encrypting list 502 and may generate encrypted list 508 by encrypting list 504.

The systems described herein may encrypt lists of encrypted files using any suitable cipher. As used herein, the term "cipher" generally refers to any algorithm for performing encryption and/or decryption. For example, a cipher may include a set of defined steps that can be followed as a procedure for encoding data. A cipher may be a block cipher, a stream cipher, and/or any other type of cipher that uses an encryption key and an initialization vector to encode data. Generating module 108 may use a block cipher implemented in any suitable type of block cipher mode, including, but not limited to, Electronic Code Book (ECB), Cipher Block Chaining (CBC), Propagating Cipher-Block Chaining (PCBC), Output Feedback Mode (OFB), Integrated Counter Mode (ICM), Cipher Feedback Mode (CFB), Counter Mode (CTR), Counter Mode with Randomized Counter (CTR$), etc.

In some examples, generating module 108 may use the same cryptographic key to encrypt each list of encrypted files within a search index without sacrificing security by using a block cipher implemented in CTR$ mode to encrypt the lists of encrypted files. In some examples, the starting value of the randomized counter used by a block cipher implemented in CTR$ mode may be equal to a random initialization vector.

Generating module 108 may generate a random initialization vector for use in encrypting a list of encrypted files in a variety of ways. In one example, generating module 108 may generate a random initialization vector for encrypting a list of encrypted files by applying a pseudo-random function (PRF) (e.g., any function that takes an input and produces a corresponding output that appears random) to the keyword associated with the list of encrypted files. By generating a random initialization vector from the keyword associated with a list of encrypted files, the systems and methods described herein may not need to store the initialization vector to later decrypt the list of encrypted files because the initialization vector may be regenerated each time a search involving the keyword is performed.

In some examples, as part of generating a random initialization vector for use in encrypting a list of encrypted files, generating module 108 may ensure that using the random initialization vector will not result in a counter range that that overlaps the counter range of any previously generated initialization vector. If use of a random initialization vector may result in overlapping counter ranges, generating module 108 may generate an alternative initialization vector.

At step 306(*c*), one or more of the systems described herein may store the encrypted list of encrypted files such that the encrypted list of encrypted files can be identified using a lookup key generated by applying a pseudo-random function to the keyword. Using FIG. 5 as an example, generating module 108 may store encrypted list 506 and encrypted list 508 in encrypted search index 408 such that encrypted list 506 and encrypted list 508 may be accessed using lookup key 512 and lookup key 514, respectively.

Figure 5:
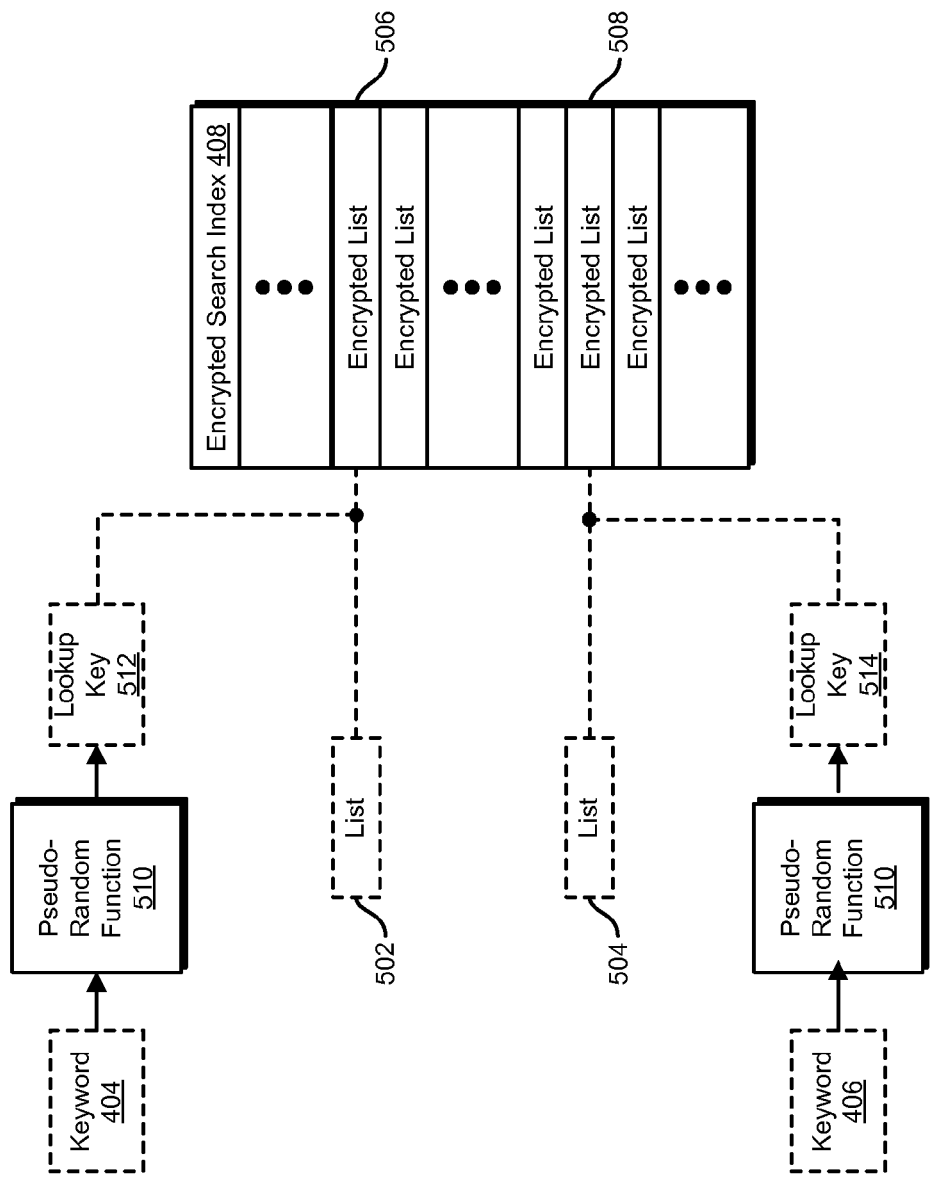
FIG. 5 is a block diagram of an additional exemplary system for maintaining encrypted search indexes on third-party storage systems.

The systems described herein may perform step 312 in any suitable manner. In general, generating module 108 may store encrypted lists of encrypted files in any data structure that maps lookup keys to the encrypted lists of encrypted files. For example, generating module 108 may store encrypted lists of encrypted files in a hash table (e.g., as illustrated in FIG. 5) or a tree. For example, generating module 108 may store an encrypted list of encrypted files as a hash table entry such that the key of the hash-table entry is equal to a value generated by applying a pseudo-random function to the keyword associated with the encrypted list of encrypted files and the value of the hash-table entry is the encrypted list of encrypted files.

Using FIG. 5 as an example, generating module 108 may store encrypted list 506 as a hash table entry in encrypted search index 408 such that the key of the hash-table entry is equal to lookup key 512 generated by applying pseudo-random function 510 to keyword 404 and the value of the hash-table entry is encrypted list 506. Similarly, generating module 108 may store encrypted list 508 as another hash table entry in encrypted search index 408 such that the key of the hash-table entry is equal to lookup key 514 generated by applying pseudo-random function 510 to keyword 406 and the value of the hash-table entry is encrypted list 508. Upon completion of step 306(*c*), exemplary method 300 in FIG. 3 may terminate.

Over time, a search index that has been created according to method 300 in FIG. 3 may become out-of-date as files are uploaded to, modified on, and/or deleted from a third-party storage system. For at least this reason, in some examples, the systems described herein may periodically update the lists of encrypted files contained in an encrypted search index. For example, whenever the systems described herein generate a new encrypted file, the systems described herein may (1) identify any keywords contained in the encrypted file and (2) append a reference to the encrypted file to the encrypted list of files associated with each identified keyword (e.g., by encrypting the reference and appending the encrypted reference to the encrypted list of encrypted files).

In some examples, whenever the systems described herein delete an encrypted file, the systems described herein may (1) identify any keywords contained in the encrypted file and (2) remove any reference to the encrypted file from the encrypted list of files associated with each identified keyword (e.g., by decrypting, updating, and reencrypting each encrypted list of files).

Additionally or alternatively, whenever the systems described herein delete an encrypted file, the systems described herein may add the deleted encrypted file to a search-result filter that may be used to remove the encrypted file from search results. In at least one example, the systems described herein may monitor the size of the search-result filter and may use the search-index filter to perform a batch update of an encrypted search index whenever the size of the search-result filter is greater than a particular threshold size.

In some examples, whenever the systems described herein detect a modified encrypted file, the systems described herein may update the encrypted search index that indexes the encrypted file as if the encrypted file was deleted and recreated. Additionally or alternatively, the systems described herein may compare the keywords contained in the encrypted file before and after it was modified and may update the encrypted lists of encrypted files associated with any new or deleted keywords.

Figure 6:
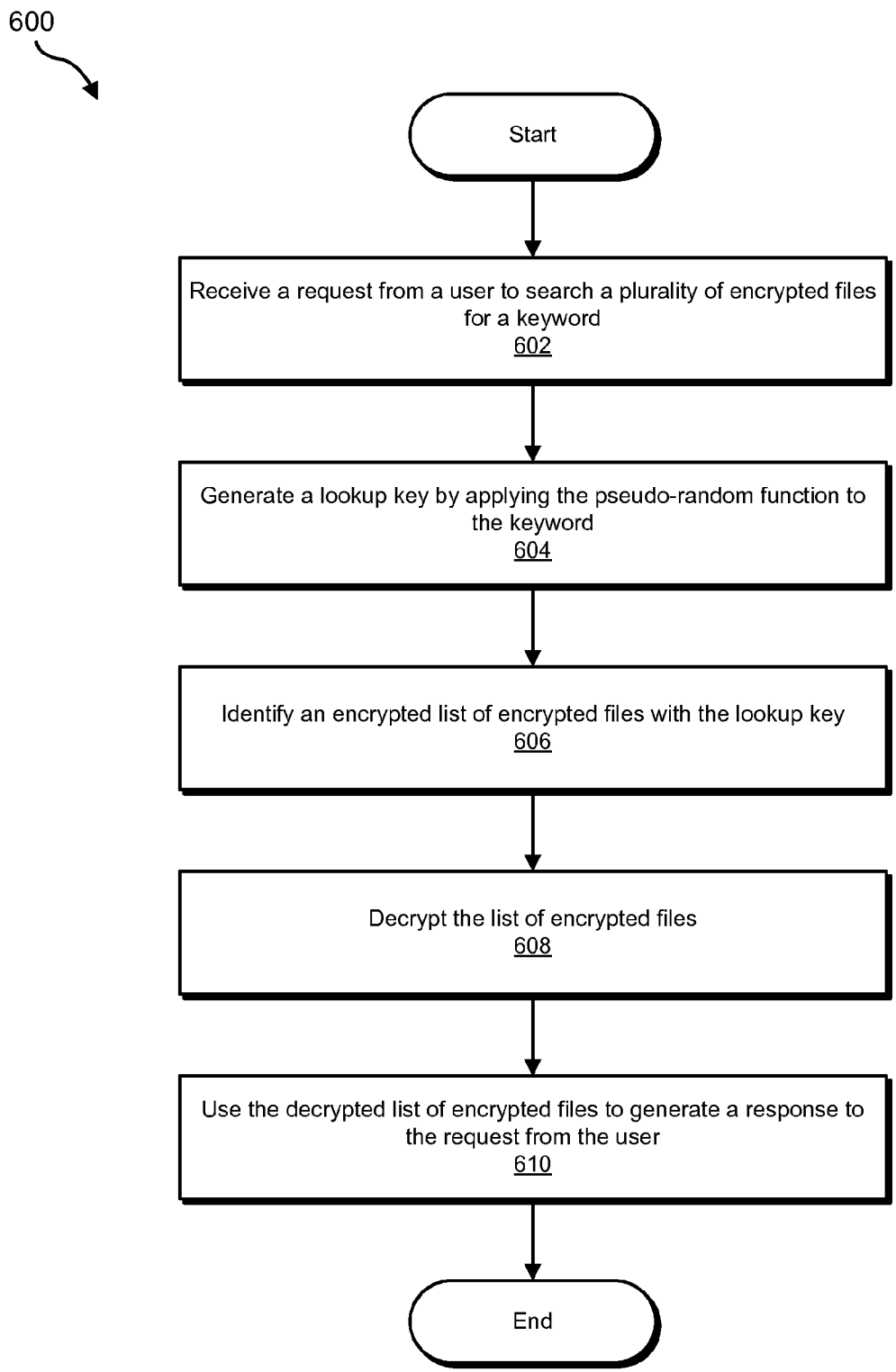
FIG. 6 is a flow diagram of an exemplary method for maintaining encrypted search indexes on third-party storage systems.
Figure 7:
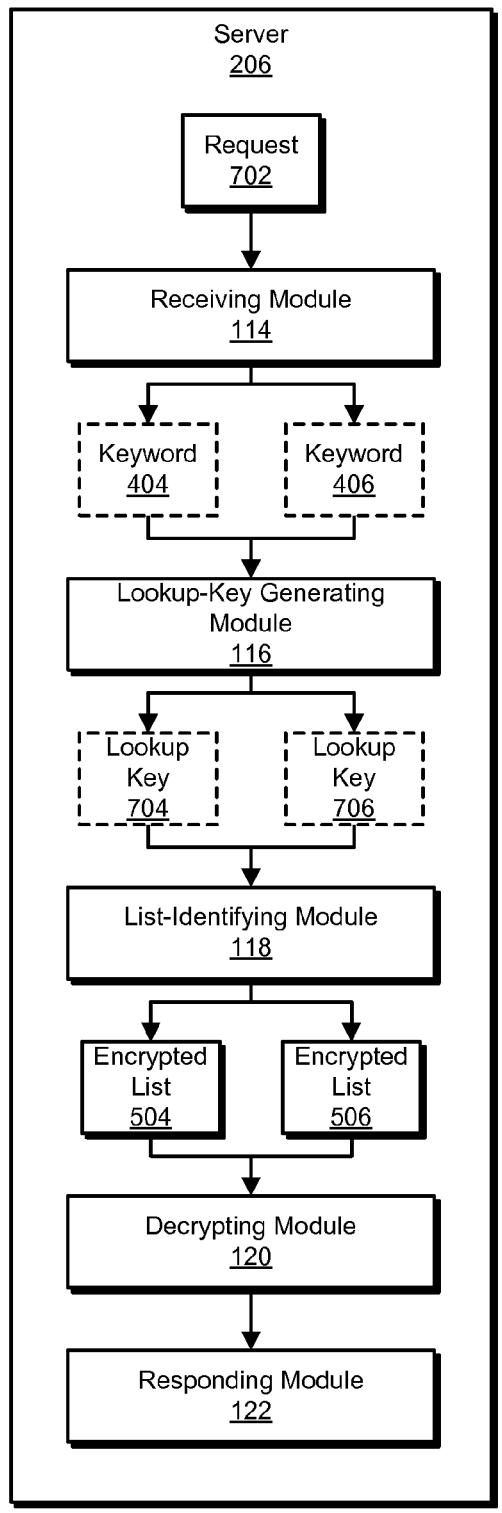
FIG. 7 is a block diagram of an additional exemplary system for maintaining encrypted search indexes on third-party storage systems.
Figure 8:
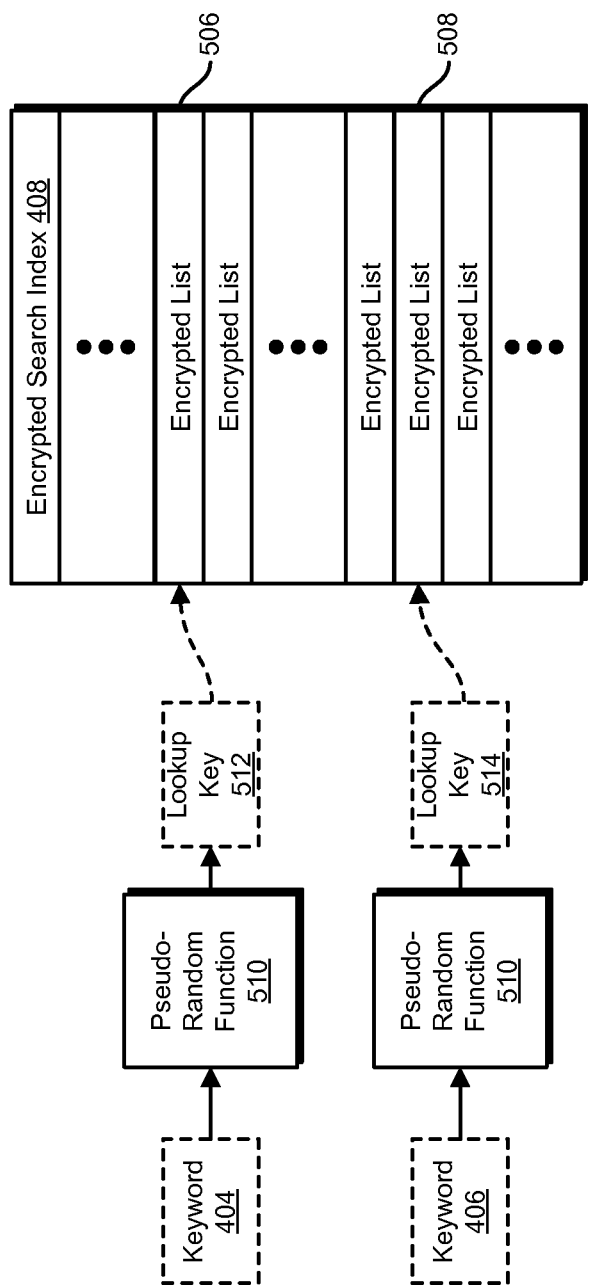
FIG. 8 is a block diagram of an additional exemplary system for maintaining encrypted search indexes on third-party storage systems.

FIG. 6 is a flow diagram of an exemplary computer-implemented method 600 for using encrypted search indexes to search encrypted files. As illustrated in FIG. 6, at step 602 one or more of the systems described herein may receive a request from a user to search a plurality of encrypted files for a keyword. For example, receiving module 114 may, as part of server 206 in FIG. 7, receive request 702 from a user to search encrypted files 402 for keywords 404 and 406.

The systems described herein may perform step 602 in a variety of contexts. For example, receiving module 114 may receive a request to search encrypted files to which a user has access. In response to receiving such a request, receiving module 114 may identify one or more search indexes designated for searching the encrypted files to which the user has access. As mentioned above, in some embodiments, the systems described herein may generate an encrypted search index for each user of a third-party storage system. In such embodiments, receiving module 114 may identify a user's encrypted search index in response to receiving a search request from the user.

At step 604, one or more of the systems described herein may generate a lookup key by applying a pseudo-random function to the keyword. In general, lookup-key generating module 116 may generate lookup keys for accessing lists of encrypted files using the same pseudo-random function that was used to store the lists of encrypted files to the search index. Using FIGS. 7 and 8 as an example, lookup-key generating module 116 may, as part of server 206 in FIG. 7, generate lookup key 512 and lookup key 514 by applying pseudo-random function 510 (e.g., the same pseudo-random function that was used to store encrypted lists 506 and 508 to encrypted search index 408) to keyword 404 and keyword 406, respectively.

At step 606, one or more of the systems described herein may identify the encrypted list of encrypted files with the lookup key. Using FIGS. 7 and 8 as an example, list-identifying module 118 may, as part of server 206 in FIG. 7, identify encrypted list 506 using lookup key 512 and encrypted list 508 using lookup key 514.

At step 608, one or more of the systems described herein may decrypt the list of encrypted files. For example, decrypting module 120 may, as part of server 206 in FIG. 7, regenerate lists 502 and 504 by decrypting encrypted lists 506 and 508.

At step 610, one or more of the systems described herein may use the decrypted list of encrypted files to generate a response to the request from the user. For example, responding module 122 may, as part of server 206 in FIG. 7, use list 502 and list 504 to generate a response to request 702.

In some examples, as mentioned above, the systems described herein may maintain a search-result filter that includes a list of files that have been deleted and/or no longer contain certain keywords instead of updating the encrypted lists contained in an encrypted search index. In these situations, responding module 122 may use the search-result filter to ensure that files that have been deleted and/or no longer contain certain keywords are not included in search results. Upon completion of step 610, exemplary method 600 in FIG. 6 may terminate.

Figure 9:
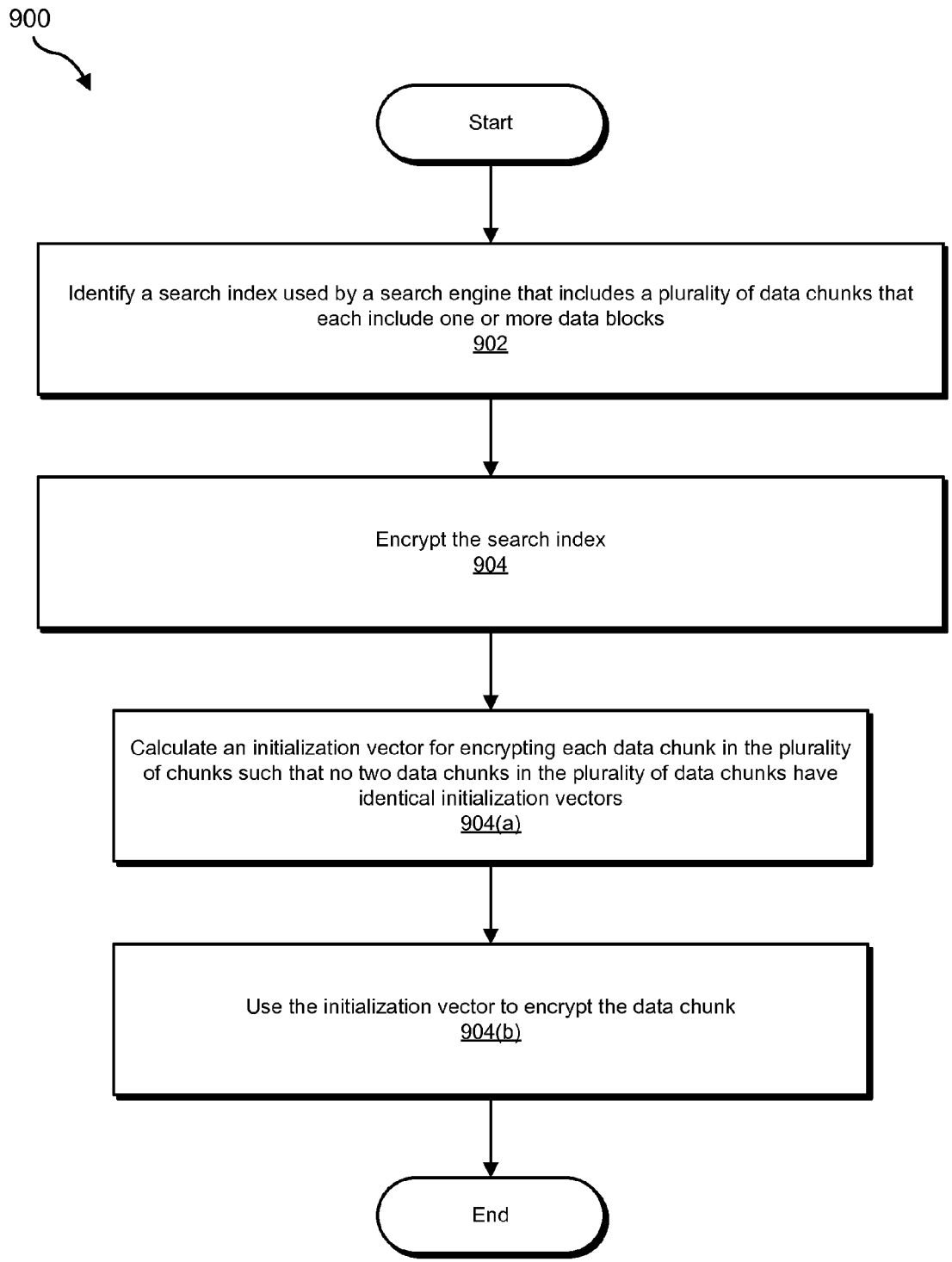
FIG. 9 is a flow diagram of an exemplary method for maintaining encrypted search indexes on third-party storage systems.

In some examples, the systems described herein may use a search engine to enable users of a third-party storage system to search encrypted data stored at the third-party storage system. FIG. 9 is a flow diagram of an exemplary computer-implemented method 900 for maintaining encrypted search indexes on third-party storage systems that use search engines. The steps shown in FIG. 9 may be performed by any suitable computer-executable code and/or computing system. In some embodiments, the steps shown in FIG. 9 may be performed by one or more of the components of system 100 in FIG. 1, system 200 in FIG. 2, computing system 1210 in FIG. 12, and/or portions of exemplary network architecture 1300 in FIG. 13.

Figure 11:
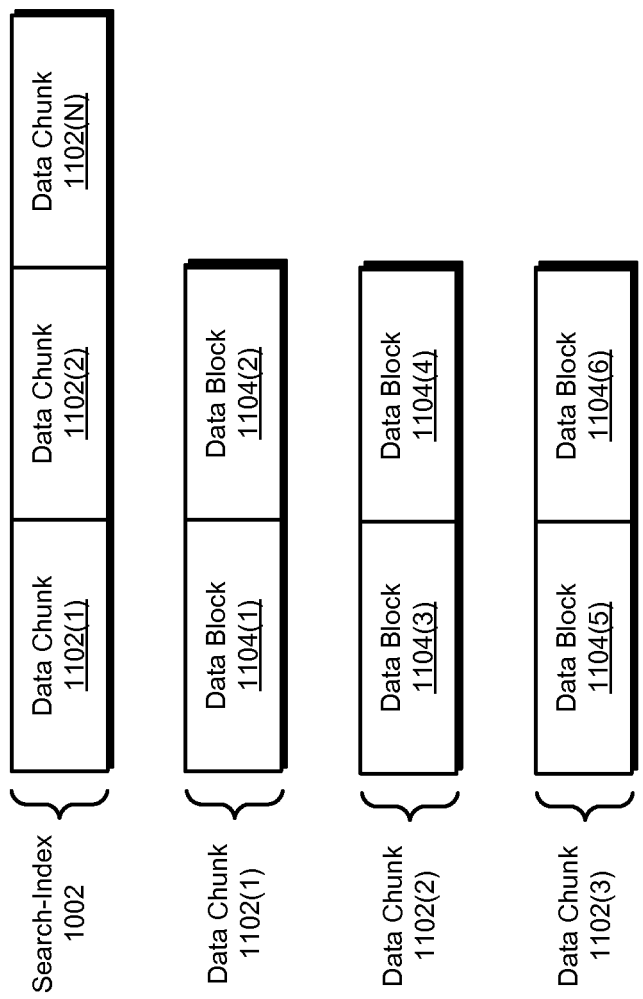
FIG. 11 is a block diagram of an exemplary search index.

As illustrated in FIG. 9, at step 902 one or more of the systems described herein may identify a search index used by a search engine that includes a plurality of data chunks that each include one or more data blocks. For example, search-index identifying module 110 may, as part of server 206 in FIG. 10, identify a search index 1002 that includes a plurality of data chunks that each include one or more data blocks (e.g., as illustrated in FIG. 11).

As used herein, the phrase "search engine" may refer to any system that accepts search request and returns search results. A search engine may maintain one or more search indexes. The phrase "search index," as used herein may refer to one or more search-index files to which a search engine stores search-index data. In some examples, a search engine may use one or more static search indexes. For example, a search engine may generate new search indexes as the search engine indexes new files rather than updating its existing search indexes. Additionally or alternatively, a search engine may use one or more dynamic search indexes. For example, a search engine may update its existing search indexes as the search engine indexes new files. In some examples, search engines may enable efficient keyword searching by implementing efficient lookup data structures (e.g., hash tables) such that search results may be generated by accessing a portion of a search index (e.g., a portion of a search-index file). As such, and as will be described in greater detail below, the systems described herein may encrypt and/or decrypt a search index used by a search engine by (1) dividing the search index into one or more data chunks and/or (2) individually encrypting and/or decrypting the data chunks that make up the search index.

The term "data chunk," as used herein, may refer to any discrete unit of data. In some examples, the term "data chunk" may refer to a fixed-size unit of data within a search index. Additionally or alternatively, in some examples the term "data chunk" may refer to a variable-size unit of data. In some examples, the term "data chunk" may refer to a unit of data that a search engine reads from and/or writes to a search-index file. For example, some search engines may read from and/or write to search-index files one data chunk at a time. Additionally or alternatively, the term "data chunk" may refer to any data within a search index that may be encrypted as a unit. In some examples, the systems described herein may divide a search index into one or more suitably sized data chunks (using, e.g., LUCENE TRANSFORM) that may be individually encrypted and/or decrypted. The term "data block," as used herein, may refer to any discrete subunit of a data chunk. In general, the term "data block" may refer to a block of data that may be encrypted by a block cipher. As such, the size of a data block may be equal to the block size of the encryption primitive used to encrypt the data chunk to which the data block belongs.

Returning to FIG. 9, the systems described herein may perform step 902 in a variety of contexts. In one example, search-index identifying module 110 may identify search indexes of a search engine as part of a plugin, add-on, or extension of a search engine (e.g., LUCENE TRANSFORM) that performs data storage and/or data encryption for the search engine. In this context, search-index identifying module 110 may identify a search index of a search engine in response to a request from the search engine to create, write to, and/or read from a file.

At step 904, one or more of the systems described herein may encrypt the search index. For example, search-index encrypting module 112 may, as part of server 206 in FIG. 7, generate encrypted search index 212 by encrypting search index 1002. In general, the systems described herein may encrypt search indexes as part of storing the search indexes as search-index files such that the search-index files are encrypted.

The systems described herein may perform step 904 by performing one or more steps (e.g., steps 904(a) and 904(b)). For example, at step 904(a), one or more of the systems described herein may calculate, for each data chunk in the plurality of data chunks, an initialization vector for encrypting the data chunk such that no two data chunks in the plurality of data chunks have identical initialization vectors. Using FIGS. 10 and 11 as an example, search-index encrypting module 112 may, as part of server 206, calculate, for each of data chunks 1102(1)-(3), an initialization vector such that no two data chunks in data chunks 1102(1)-(3) have identical initialization vectors.

As used herein, the phrase "initialization vector" generally refers to any input to a cipher that may be used in combination with an encryption key to encrypt data using the cipher. For example, in a block cipher, an initialization vector may be linearly added to and/or logically XORed with a block of plain text or may be included in front of plain text prior to encryption. As mentioned above, an initialization vector may be used as the starting value of a counter used by a block cipher implemented in CTR or CTR$ mode.

The systems described herein may perform step 904(a) in any suitable manner. For example, search-index encrypting module 112 may calculate a unique initialization vector for each data chunk within a search index using a search-index initialization vector (e.g., a unique initialization vector designated for encrypting the search index, such as search-index initialization vector 1004 in FIG. 10). In some examples, search-index encrypting module 112 may generate a search-index initialization vector from a standard pseudorandom generator. In at least one example, search-index encrypting module 112 may generate a search-index initialization vector using a search-index's metadata.

In some examples, if the size of each data chunk in a search index is equal to the block size of the block cipher that will be used to encrypt each data chunk, search-index encrypting module 112 may calculate a unique initialization vector for each data chunk using the search-index initialization vector and a counter. Using FIG. 11 as an example, if the search-index initialization vector designated for search index 1002 is equal to 100, search-index encrypting module 112 may calculate an initialization vector for data chunk 1102(1) that is equal to 101 (100+1=101), an initialization vector for data chunk 1102(2) that is equal to 102 (100+2=102), and an initialization vector for data chunk 1102(3) that is equal to 103 (100+3=103).

In some examples, search-index encrypting module 112 may calculate a unique initialization vector for a data chunk within a search index using a search-index initialization vector and a unique nonce designated for the data chunk. For example, search-index encrypting module 112 may generate an initialization vector for a data chunk using the following formula: chunk_IV=search_index_IV+chunk_nonce*blocks_per_chunk, where chunk_IV represents the initialization vector for the data chunk, search_index_IV represents the search-index initialization vector, chunk_nonce represents the unique nonce designated for the data chunk, and blocks_per_chunk represents the number of data blocks in a data chunk. In general, search-index encrypting module 112 may generate a unique nonce for a data chunk such that the size of the unique nonce is less than the size of the initialization vector with which the nonce will be used to generate.

In at least one example, search-index encrypting module 112 may generate a unique nonce for each data chunk in a search index using a global counter (e.g., global counter 1006 in FIG. 10). The following provides an example of how search-index encrypting module 112 may calculate unique initialization vectors for data chunks 1102(1)-(3) in FIG. 11 if the search-index initialization vector designated for search index 1002 is equal to 100, and the unique nonces for chunk 1102(1), chunk 1102(2), and chunk 1102(3) equal 1, 2, and 3, respectively. In this example, search-index encrypting module 112 may calculate an initialization vector for data chunk 1102(1) that is equal to 102 (100+1*2=102), an initialization vector for data chunk 1102(2) that is equal to 104 (100+2*2=104), and an initialization vector for data chunk 1102(3) that is equal to 106 (100+3*2=106).

In some examples, search-index encrypting module 112 may generate a new initialization vector and/or unique nonce for a data chunk each time the data chunk is reencrypted. For example, if data chunk 1102(2) in the example above is modified, search-index encrypting module 112 may increment the global counter (e.g., such that the global counters value is equal to 4) and calculate a new initialization vector for data chunk 1102(1) that is equal to 108 (100+4*2=108).

In some examples, search-index encrypting module 112 may generate random nonces for data chunks. In one example, search-index encrypting module 112 may generate a random nonce for a data chunk by (1) generating a unique nonce using a global counter (e.g., as described above) and (2) encrypting the unique nonce using a pseudo-random permutation implemented via format-preserving encryption. In some examples, search-index encrypting module 112 may generate the pseudo-random permutation using a cryptographic key, file metadata, and/or any stored random data.

As part of generating a random initialization vector for use in encrypting data chunks, search-index encrypting module 112 may ensure that using an initialization vector will not result in a counter range that overlaps a possible counter range of any previously generated initialization vector. If an initialization vector results in overlapping counter ranges, generating module 108 may generate an alternative initialization vector.

At step 904(b), one or more of the systems described herein may use the initialization vector to encrypt the data chunk. For example, search-index encrypting module 112 may, as part of server 206 in FIG. 10, use the initialization vectors calculated as part of step 904(a) to encrypt data chunks 1102(1)-(3).

The systems described herein may encrypt data chunks using any suitable cipher. In one example, search-index encrypting module 112 may use a block cipher implemented in CTR$ mode to encrypt each data chunk in a search index. When using a block cipher implemented in CTR$ mode to encrypt a data chunk, search-index encrypting module 112 may initialize the randomized counter of the block cipher using the initialization vector calculated for the data chunk as part of step 904(a). Upon completion of step 904(b), exemplary method 900 in FIG. 9 may terminate.

As explained above, by generating encrypted search indexes on third-party storage systems that may be accessed using lookup keys generated by applying a pseudo-random function to keywords, the systems and methods described herein may enable secure keyword indexing and efficient keyword searching of encrypted files stored on third-party storage systems. Moreover, by encrypting search indexes of search engines (e.g., APACHE's LUCENE and SOLR), these systems and methods may improve the security of encrypted files that are indexed by the search engines while maintaining the search functionality provided by the search engines.

Figure 12:
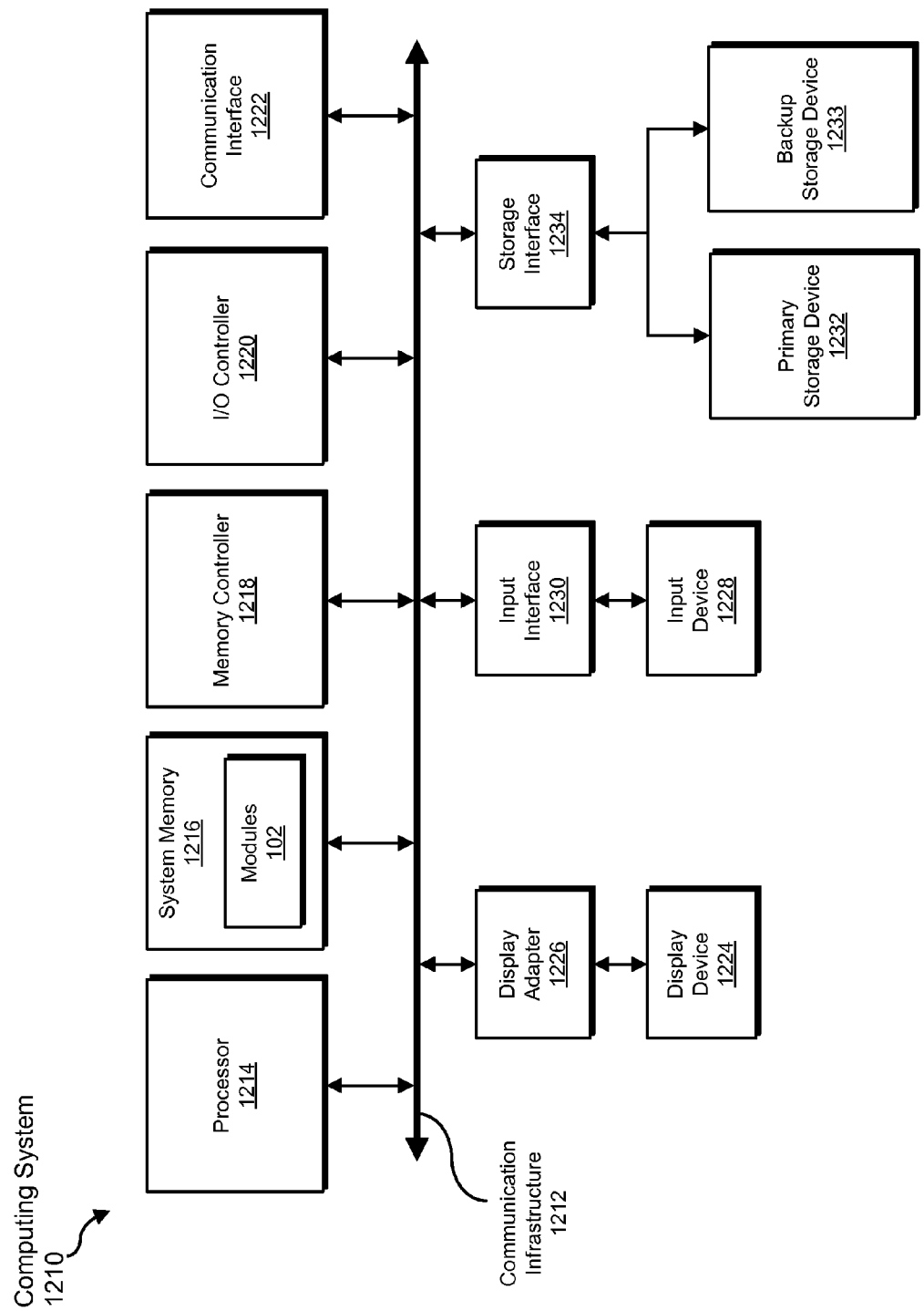
FIG. 12 is a block diagram of an exemplary computing system capable of implementing one or more of the embodiments described and/or illustrated herein.

FIG. 12 is a block diagram of an exemplary computing system 1210 capable of implementing one or more of the embodiments described and/or illustrated herein. For example, all or a portion of computing system 1210 may perform and/or be a means for performing, either alone or in combination with other elements, one or more of the steps described herein (such as one or more of the steps illustrated in FIGS. 3, 6, and 9). All or a portion of computing system 1210 may also perform and/or be a means for performing any other steps, methods, or processes described and/or illustrated herein.

Computing system 1210 broadly represents any single or multi-processor computing device or system capable of executing computer-readable instructions. Examples of computing system 1210 include, without limitation, workstations, laptops, client-side terminals, servers, distributed computing systems, handheld devices, or any other computing system or device. In its most basic configuration, computing system 1210 may include at least one processor 1214 and a system memory 1216.

Processor 1214 generally represents any type or form of physical processing unit (e.g., a hardware-implemented central processing unit) capable of processing data or interpreting and executing instructions. In certain embodiments, processor 1214 may receive instructions from a software application or module. These instructions may cause processor 1214 to perform the functions of one or more of the exemplary embodiments described and/or illustrated herein.

System memory 1216 generally represents any type or form of volatile or non-volatile storage device or medium capable of storing data and/or other computer-readable instructions. Examples of system memory 1216 include, without limitation, Random Access Memory (RAM), Read Only Memory (ROM), flash memory, or any other suitable memory device. Although not required, in certain embodiments computing system 1210 may include both a volatile memory unit (such as, for example, system memory 1216) and a non-volatile storage device (such as, for example, primary storage device 1232, as described in detail below). In one example, one or more of modules 102 from FIG. 1 may be loaded into system memory 1216.

In certain embodiments, exemplary computing system 1210 may also include one or more components or elements in addition to processor 1214 and system memory 1216. For example, as illustrated in FIG. 12, computing system 1210 may include a memory controller 1218, an Input/Output (I/O) controller 1220, and a communication interface 1222, each of which may be interconnected via a communication infrastructure 1212. Communication infrastructure 1212 generally represents any type or form of infrastructure capable of facilitating communication between one or more components of a computing device. Examples of communication infrastructure 1212 include, without limitation, a communication bus (such as an Industry Standard Architecture (ISA), Peripheral Component Interconnect (PCI), PCI Express (PCIe), or similar bus) and a network.

Memory controller 1218 generally represents any type or form of device capable of handling memory or data or controlling communication between one or more components of computing system 1210. For example, in certain embodiments memory controller 1218 may control communication between processor 1214, system memory 1216, and I/O controller 1220 via communication infrastructure 1212.

I/O controller 1220 generally represents any type or form of module capable of coordinating and/or controlling the input and output functions of a computing device. For example, in certain embodiments I/O controller 1220 may control or facilitate transfer of data between one or more elements of computing system 1210, such as processor 1214, system memory 1216, communication interface 1222, display adapter 1226, input interface 1230, and storage interface 1234.

Communication interface 1222 broadly represents any type or form of communication device or adapter capable of facilitating communication between exemplary computing system 1210 and one or more additional devices. For example, in certain embodiments communication interface 1222 may facilitate communication between computing system 1210 and a private or public network including additional computing systems. Examples of communication interface 1222 include, without limitation, a wired network interface (such as a network interface card), a wireless network interface (such as a wireless network interface card), a modem, and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1222 may also represent a host adapter configured to facilitate communication between computing system 1210 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1222 may also allow computing system 1210 to engage in distributed or remote computing. For example, communication interface 1222 may receive instructions from a remote device or send instructions to a remote device for execution.

As illustrated in FIG. 12, computing system 1210 may also include at least one display device 1224 coupled to communication infrastructure 1212 via a display adapter 1226. Display device 1224 generally represents any type or form of device capable of visually displaying information forwarded by display adapter 1226. Similarly, display adapter 1226 generally represents any type or form of device configured to forward graphics, text, and other data from communication infrastructure 1212 (or from a frame buffer, as known in the art) for display on display device 1224.

As illustrated in FIG. 12, exemplary computing system 1210 may also include at least one input device 1228 coupled to communication infrastructure 1212 via an input interface 1230. Input device 1228 generally represents any type or form of input device capable of providing input, either computer or human generated, to exemplary computing system 1210. Examples of input device 1228 include, without limitation, a keyboard, a pointing device, a speech recognition device, or any other input device.

As illustrated in FIG. 12, exemplary computing system 1210 may also include a primary storage device 1232 and a backup storage device 1233 coupled to communication infrastructure 1212 via a storage interface 1234. Storage devices 1232 and 1233 generally represent any type or form of storage device or medium capable of storing data and/or other computer-readable instructions. For example, storage devices 1232 and 1233 may be a magnetic disk drive (e.g., a so-called hard drive), a solid state drive, a floppy disk drive, a magnetic tape drive, an optical disk drive, a flash drive, or the like. Storage interface 1234 generally represents any type or form of interface or device for transferring data between storage devices 1232 and 1233 and other components of computing system 1210.

In certain embodiments, storage devices 1232 and 1233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1233 may also include other similar structures or devices for allowing computer software, data, or other computer-readable instructions to be loaded into computing system 1210. For example, storage devices 1232 and 1233 may be configured to read and write software, data, or other computer-readable information. Storage devices 1232 and 1233 may also be a part of computing system 1210 or may be a separate device accessed through other interface systems.

Many other devices or subsystems may be connected to computing system 1210. Conversely, all of the components and devices illustrated in FIG. 12 need not be present to practice the embodiments described and/or illustrated herein. The devices and subsystems referenced above may also be interconnected in different ways from that shown in FIG. 12. Computing system 1210 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1210. All or a portion of the computer program stored on the computer-readable medium may then be stored in system memory 1216 and/or various portions of storage devices 1232 and 1233. When executed by processor 1214, a computer program loaded into computing system 1210 may cause processor 1214 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1210 may be configured as an Application Specific Integrated Circuit (ASIC) adapted to implement one or more of the exemplary embodiments disclosed herein.

Figure 13:
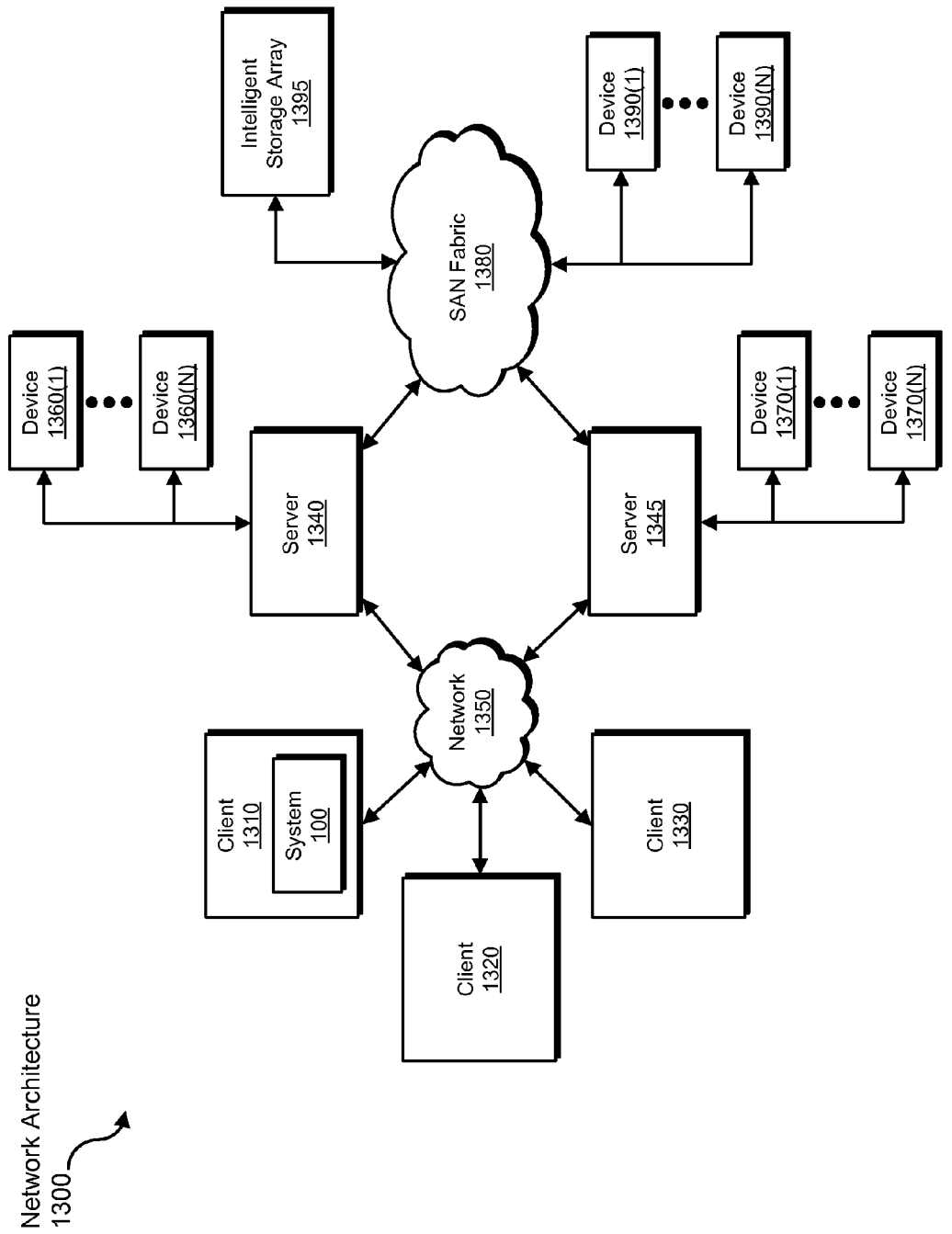
FIG. 13 is a block diagram of an exemplary computing network capable of implementing one or more of the embodiments described and/or illustrated herein.

FIG. 13 is a block diagram of an exemplary network architecture 1300 in which client systems 1310, 1320, and 1330 and servers 1340 and 1345 may be coupled to a network 1350. As detailed above, all or a portion of network architecture 1300 may perform and/or be a means for performing, either alone or in combination with other elements, one or more of the steps disclosed herein (such as one or more of the steps illustrated in FIG. 3). All or a portion of network architecture 1300 may also be used to perform and/or be a means for performing other steps and features set forth in the instant disclosure.

Client systems 1310, 1320, and 1330 generally represent any type or form of computing device or system, such as exemplary computing system 1210 in FIG. 12. Similarly, servers 1340 and 1345 generally represent computing devices or systems, such as application servers or database servers, configured to provide various database services and/or run certain software applications. Network 1350 generally represents any telecommunication or computer network including, for example, an intranet, a WAN, a LAN, a PAN, or the Internet. In one example, client systems 1310, 1320, and/or 1330 and/or servers 1340 and/or 1345 may include all or a portion of system 100 from FIG. 1.

As illustrated in FIG. 13, one or more storage devices 1360(1)-(N) may be directly attached to server 1340. Similarly, one or more storage devices 1370(1)-(N) may be directly attached to server 1345. Storage devices 1360(1)-(N) and storage devices 1370(1)-(N) generally represent any type or form of storage device or medium capable of storing data and/or other computer-readable instructions. In certain embodiments, storage devices 1360(1)-(N) and storage devices 1370(1)-(N) may represent Network-Attached Storage (NAS) devices configured to communicate with servers 1340 and 1345 using various protocols, such as Network File System (NFS), Server Message Block (SMB), or Common Internet File System (CIFS).

Servers 1340 and 1345 may also be connected to a Storage Area Network (SAN) fabric 1380. SAN fabric 1380 generally represents any type or form of computer network or architecture capable of facilitating communication between a plurality of storage devices. SAN fabric 1380 may facilitate communication between servers 1340 and 1345 and a plurality of storage devices 1390(1)-(N) and/or an intelligent storage array 1395. SAN fabric 1380 may also facilitate, via network 1350 and servers 1340 and 1345, communication between client systems 1310, 1320, and 1330 and storage devices 1390(1)-(N) and/or intelligent storage array 1395 in such a manner that devices 1390(1)-(N) and array 1395 appear as locally attached devices to client systems 1310, 1320, and 1330. As with storage devices 1360(1)-(N) and storage devices 1370(1)-(N), storage devices 1390(1)-(N) and intelligent storage array 1395 generally represent any type or form of storage device or medium capable of storing data and/or other computer-readable instructions.

In certain embodiments, and with reference to exemplary computing system 1210 of FIG. 12, a communication interface, such as communication interface 1222 in FIG. 12, may be used to provide connectivity between each client system 1310, 1320, and 1330 and network 1350. Client systems 1310, 1320, and 1330 may be able to access information on server 1340 or 1345 using, for example, a web browser or other client software. Such software may allow client systems 1310, 1320, and 1330 to access data hosted by server 1340, server 1345, storage devices 1360(1)-(N), storage devices 1370(1)-(N), storage devices 1390(1)-(N), or intelligent storage array 1395. Although FIG. 13 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1340, server 1345, storage devices 1360(1)-(N), storage devices 1370(1)-(N), storage devices 1390(1)-(N), intelligent storage array 1395, or any combination thereof. All or a portion of one or more of the exemplary embodiments disclosed herein may also be encoded as a computer program, stored in server 1340, run by server 1345, and distributed to client systems 1310, 1320, and 1330 over network 1350.

As detailed above, computing system 1210 and/or one or more components of network architecture 1300 may perform and/or be a means for performing, either alone or in combination with other elements, one or more steps of an exemplary method for maintaining encrypted search indexes on third-party storage systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive search-index data to be transformed, transform the search-index data into an encrypted search index, output a result of the transformation to a third-party storage system, use the result of the transformation to perform searches at the third-party storage system, and store the result of the transformation to the third-party storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for maintaining encrypted search indexes on third-party storage systems, at least a portion of the method being performed by a computing device comprising at least one processor, the method comprising:
    identifying, at a server-side computing system, a plurality of encrypted files that were previously transmitted from a client-side computing system of a user to the server-side computing system in an unencrypted state, wherein the server-side computing system encrypted and stored each of the plurality of encrypted files;
    identifying, at the server-side computing system, a plurality of unencrypted keywords, wherein each of the plurality of unencrypted keywords is contained in at least one of the plurality of encrypted files;
    generating, at the server-side computing system, an encrypted search index for searching the plurality of encrypted files by:
        identifying, at the server-side computing system for each unencrypted keyword in the plurality of unencrypted keywords, a list of encrypted files in the plurality of encrypted files that contain the unencrypted keyword;
        identifying, at the server-side computing system, a single cryptographic key designated for the user;
        encrypting, at the server-side computing system, the list of encrypted files of each unencrypted keyword in the plurality of unencrypted keywords using the single cryptographic key designated for the user; and
        storing, at the server-side computing system, the encrypted list of encrypted files of each unencrypted keyword in the plurality of unencrypted keywords in association with a lookup key that is generated by applying a pseudo-random function to the unencrypted keyword associated with the encrypted list of encrypted files;
    receiving, at the server-side computing system, a request from the user to search the plurality of encrypted files for a search keyword;
    generating, at the server-side computing system, a lookup key from the search keyword by applying the pseudo-random function to the search keyword;
    using the lookup key generated from the search keyword to identify, at the server-side computing system, an encrypted list of encrypted files associated with the search keyword;
    decrypting, at the server-side computing system, the encrypted list of encrypted files associated with the search keyword using the single cryptographic key designated for the user;
    using, at the server-side computing system, the decrypted list of encrypted files associated with the search keyword to generate a response to the request from the user.

2. The method of claim 1, wherein the step of identifying the plurality of unencrypted keywords is performed as part of encrypting the plurality of encrypted files.

3. The method of claim 1, further comprising detecting the deletion of at least one encrypted file contained in the encrypted list of encrypted files associated with the search keyword, wherein using the decrypted list of encrypted files associated with the search keyword to generate the response to the request from the user comprises ensuring that the deleted encrypted file is not included in the response.

4. The method of claim 3, further comprising updating the list of encrypted files associated with the search keyword to reflect the deletion of the encrypted file.

5. The method of claim 1, wherein identifying the plurality of unencrypted keywords comprises extracting the plurality of unencrypted keywords from the plurality of encrypted files after using the single cryptographic key designated for the user to decrypt the plurality of encrypted files.

6. The method of claim 1, wherein encrypting the list of encrypted files of each unencrypted keyword in the plurality of unencrypted keywords comprises encrypting the list of encrypted files of each unencrypted keyword in the plurality of unencrypted keywords using a mode of operation with a randomized counter.

7. The method of claim 6, wherein encrypting the list of encrypted files of each unencrypted keyword in the plurality of unencrypted keywords comprises generating the randomized counter by applying the pseudo-random function to the unencrypted keyword.

8. The method of claim 1, wherein storing the encrypted list of encrypted files of each unencrypted keyword in the plurality of unencrypted keywords comprises storing the encrypted list of each unencrypted keyword in the plurality of unencrypted keywords in a data structure that maps lookup keys to lists of encrypted files.

9. The method of claim 8, wherein the data structure comprises a hash table.

10. A system for maintaining encrypted search indexes on third-party storage systems, the system comprising:
   a file-identifying module, stored in memory, that identifies, at a server-side computing system, a plurality of encrypted files that were previously transmitted from a client-side computing system of a user to the server-side computing system in an unencrypted state, wherein the server-side computing system encrypted and stored each of the plurality of encrypted files;
   a keyword-identifying module, stored in memory, that identifies, at the server-side computing system, a plurality of unencrypted keywords, wherein each of the plurality of unencrypted keywords is contained in at least one of the plurality of encrypted files;
   a generating module, stored in memory, that generates, at the server-side computing system, an encrypted search index for searching the plurality of encrypted files by:
      identifying, at the server-side computing system for each unencrypted keyword in the plurality of unencrypted keywords, a list of encrypted files in the plurality of encrypted files that contain the unencrypted keyword;
      identifying, at the server-side computing system, a single cryptographic key designated for the user;
      encrypting, at the server-side computing system, the list of encrypted files of each unencrypted keyword in the plurality of unencrypted keywords using the single cryptographic key designated for the user; and
      storing, at the server-side computing system, the encrypted list of encrypted files of each unencrypted keyword in the plurality of unencrypted keywords in association with a lookup key that is generated by applying a pseudo-random function to the unencrypted keyword associated with the encrypted list of encrypted files; and
   at least one processor that executes the file-identifying module, the keyword-identifying module, and the generating module.

11. The system of claim 10, further comprising:
   a search-index identifying module, stored in memory, that identifies, as part of a plugin of a search engine, a search index used by the search engine, wherein:
      the search index comprises a plurality of data chunks;
      each of the plurality of data chunks comprises one or more data blocks; and
      a search-index initialization vector is designated for encrypting the search index; and
   a search-index encrypting module, stored in memory, that encrypts, as part of the plugin of the search engine, the search index by, for each data chunk in the plurality of data chunks:
      calculating an initialization vector for encrypting the data chunk such that no two data chunks in the plurality of data chunks have identical initialization vectors by:
         calculating a unique nonce for the data chunk; and
         calculating the initialization vector by summing the search-index initialization vector with a product of the unique nonce and a number of the one or more data blocks; and
      using the initialization vector to encrypt the data chunk.

* * * * *